Oct. 8, 1974 F. J. SERGEYS Re. 28,195

POROUS-CERAMIC EXHAUST OXIDATION CATALYST

Original Filed Oct. 22, 1970 2 Sheets-Sheet 1

POROUS-CERAMIC EXHAUST OXIDATION CATALYST

Original Filed Oct. 22, 1970 2 Sheets-Sheet 2

United States Patent Office

Re. 28,195
Reissued Oct. 8, 1974

78,195

POROUS-CERAMIC EXHAUST OXIDATION CATALYST

Frank J. Sergeys, Kensington, Md., assignor to W. R. Grace & Co., New York, N.Y.

Original No. 3,755,204, dated Aug. 28, 1973, Ser. No. 82,918, Oct. 22, 1970. Application for reissue Feb. 6, 1974, Ser. No. 440,220
Int. Cl. B01j *11/08, 11/40*
U.S. Cl. 252—455 R 4 Claims

Matter enclosed in heavy brackets [ ] appears in the original patent but forms no part of this reissue specification; matter printed in italics indicates the additions made by reissue.

ABSTRACT OF THE DISCLOSURE

Method of preparing temperature resistant exhaust oxidation catalysts suitable for use in land vehicle exhaust systems comprising a porous ceramic base impregnated with suitable oxidizing agents and the resulting catalysts. The porous ceramic base is prepared from a ceramic powder filled, plasticized polyolefin.

Reference is made to copending application Ser. No. 83,020, filed Oct. 22, 1970 and now abandoned, inventor Christian B. Lundsager, of common ownership herewith, directed to the method of preparing the aforesaid ceramic base used in making the catalysts of this invention.

This invention is a porous ceramic structure impregnated with suitable exhaust oxidation agents which is suitable for removing pollutants from land vehicle exhaust fumes and the preparation of the catalyst. This invention is also the method of producing the impregnated porous ceramic structure.

The problem of air pollution is not a new one. However, the problem has become aggravated in many cities in recent years. The air in most cities contains substantial quantities of both oxides of nitrogen and the products of incomplete combustion of organic fuels. In the presence of sunlight, photolysis of the oxides of nitrogen leads to the formation of measurable quantities of ozone. The ozone, in turn, reacts with various organic pollutants to form compounds which can cause the many undesirable manifestations of smog, such as eye irritation, visibility reduction and plant damage.

When meterorological conditions prevent the rapid dispersion of pollutants a smog condition results. Furthermore, it is now known that in many cities a major portion or organic pollutants are derived from unburned or partially burned gasoline in auto exhaust.

Another pollutant of much concern is carbon monoxide which is undesirable because of its toxic nature. This, too, is derived mainly from exhaust emissions.

Almost since the advent of the automobile and diesel engine powered vehicles, attempts have been made to solve the problem by rendering harmless and unobjectionable the noxious fumes which are the by-products of internal combustion engines. Various devices and filters using elementary catalytic materials, and since the 1920's, various modifications of filters and mufflers, have been designed in an attempt to solve this problem. To date, none have met with success complete enough for practical applications. One of the most difficult problems to overcome is the fact that although a given purification system appears to work initially within a short period of time it becomes thoroughly contaminated and consequently useless. It does not seem feasible to install catalytic systems which must be periodically removed and rejuvenated because of the cost of such a system and such treatment.

Several investigators have realized that the only practical way to treat exhaust fumes to reduce hydrocarbon and carbon monoxide pollution is to oxidize the hydrocarbons to carbon dioxide and water and to oxidize the carbon monoxide to carbon dioxide.

A wide selection of oxidation catalysts has been produced in the past varying both in the chemical composition and physical structure. With respect to chemical composition, the ability of a wide variety of metals and metal oxides, either alone or in combination, to catalyze the complete oxidation of hydrocarbons has been noted.

To be sufficiently efficient in the removal of hydrocarbons and carbon monoxide from internal combustion engine exhaust gases and to meet the standards of maximum emission currently under consideration in the legislatures of the various states, the catalyst for treating exhaust gas must become efficient within a very few minutes after engine start-up and must maintain its activity throughout the various modes of engine operation. A catalytic converter must maintain its catalytic activity for a period of not less than 1 year and preferably for over 12,000 miles of engine operation. The problem of excessively high temperatures which are obtained when high concentrations of pollutants are being oxidized must also be solved in this system. It is not unusual for catalyst temperatures to reach 1,600° F. or higher. A normal catalytic system cannot withstand thermal degradation of the catalyst.

In this connection, the problem of conversion of carbon monoxide at the low temperatures obtained in a catalytic muffler system at the start-up period of the engine operation is particularly troublesome. A catalyst must be active initially to be acceptable for use in an auto exhaust catalytic system. It is not sufficient that a catalyst will have a good activity after the engine is warmed up and the catalyst bed is at a temperautre high enough to cause exhaust vapors passing through the bed to be oxidized to carbon dioxide and water.

The catalytic systems which have been devised to give satisfactory results for carbon monoxide conversion frequently suffer from relatively poor conversion of hydrocarbons. Since the ideal catalytic system gives a good conversion of both of these exhaust gas components, this problem is of prime importance.

An additional difficulty in the preparation of auto exhaust catalysts and the design of suitable mufflers for the integration of the exhaust catalyst into the conversion system is the problem caused by the presence of oxides of lead and particles of metallic lead in the exhaust. This lead results from the conversion of tetraethyl lead which is still the most commonly used gasoline anti-knock additive. In the preparation of gasolines, a quantity of tetraethyl lead is added to the gasoline at the refinery to impart anti-knock properties to the fuel. In addition to the tetraethyl lead, various compounds such as ethylene bromide, for example, are added, which convert the lead to volatile compounds which have an appreciable vapor pressure and are thus carried out of the engine into the exhaust system. The presence of these compounds causes problems with catalytic systems in that these lead salts, in addition to physically coating the individual catalyst particles, cause decreased attrition resistance by deterioration and breakdown of these particles.

Another difficulty in the removal of pollutants from auto exhaust fumes is the expensive method of producing porous ceramic bodies of sufficient number to meet today's needs and which are able to withstand the temperatures to which they are necessarily subjected in the exhaust systems of land vehicles.

The use of organic binders for ceramic powders is a well established commercial practice. Attempts to use fillers in a similar manner to extend or reinforce the more crystalline polyolefins, however, have met with failure. Brittle products are generally obtained even with moderate filler concentrations. Previous attempts have been made to produce polyethylene/filler blends using conventional inert fillers alone. Occasionally, these blends are found to have greater tensile strength than the unfilled polymer but when the polyethylene is heated it tends to have a low viscosity and is therefore not easily workable.

On the whole, reported studies of polyolefin (especially polyethylene)/filler blends indicate that satisfactory products are rarely obtained. Small amounts of some inorganic materials can be blended into polyethylene as pigments, but serve no other purpose.

With the advent of high molecular weight polyolefins (at least 150,000) there was a renewed interest in the area of organic binders for ceramic powders. However, these high molecular weight polyolefins were of little improvement since they could not be shaped conveniently by thermoplastic methods because of their high viscosities. Attempts to load the high molecular weight polyolefins with fillers, particularly ceramic powders further aggravated this condition.

More recently, however, it has been found that it is possible to provide a low cost, tough, flexible polyolefin/filler composition. A process for preparing such a composition is described in Australian Pat. No. 277,981 and Great Britain Pat. No. 1,044,502. The latter patent discloses a method of producing a composition containing (i) a polyolefin of molecular weight sufficiently high to give it a standard load melt index of substantially zero (ii) an inert filler, e.g., ceramic powder, and (iii) a plasticizer. The composition described therein comprises 10–80 percent by volume polyolefin, 5–60 percent by volume filler material, and 15–85 percent by volume plasticizer.

The former patent, Australia Pat. No. 277,981 discloses a similar method of producing a composition which comprises 5–95 percent by volume polyolefin, 5–50 percent by volume filler, and 5–40 percent by volume plasticizer.

Attempts to form ceramic structures have also met with little success because in the early stages of firing the structures became distorted or even cracked. Attempts to overcome this difficulty have been unsuccessful. Various mixtures of thermoplastic binders have been found to be entirely unsuccessful.

Porous ceramic structures are used for catalyst supports, absorption drying, separation of liquid phases, etc. Generally, porous ceramics are either prepared by one of two methods. The first method consists of firing an alumina silicate with a small amount of flux to form a slight glassy bond. In the other method alumina grain is fired with a ceramic material which melts and holds the grain together. Although both of these methods produce excellent porous ceramics, both are time consuming and production is slow.

Porous ceramic structures which are used in filtration processes allow cleaning without halting flow of the material being cleaned. Cleaning is often accomplished, in the case of organic materials, by ignition to 1,200°–1,600° F. without damage, and also by mechanical brushing. In chemical processing gas is forced through a catalytic porous structure enabling the purified gas to pass through the structure and the porous ceramic structure to retain the contaminants. However, in all cases there exists the slowness of production of the porous structure.

Attempts to prepare porous ceramic articles have met with failure in that there has been an absence of success in preparing a sturdy porous ceramic article from a ceramic powder filled, plasticized thermoplastic.

It is accordingly an object of this invention to provide a method for producing porous ceramic bodies containing land vehicle exhaust oxidizing agents capable of removing pollutants from a vehicle's exhaust fumes.

It is further an object of this invention to produce a porous catalyst containing ceramic structure from a flexible low-cost polyolefin material. It is a further object of this invention to produce a porous ceramic catalyst from a highly filled polyolefin material containing a plasticizer. It is a further object of this invention to produce a porous ceramic article suitable for use as a catalyst support by the steps of (i) preparing a composition comprising a ceramic filler, a plasticizer, and a polyolefin material, (ii) shaping the material, (iii) extracting the plasticizer, (iv) burning the shaped material to remove the polyolefin, (v) firing the ceramic material which remains, and (vi) impregnating the ceramic material with an oxidation catalyst.

It is a further object to produce a porous ceramic exhaust catalyst. More specifically, it is an object to provide a low-cost, easy to make, porous ceramic automobile exhaust catalyst. Further objects will be apparent from the following description of this invention.

FIG. 5 is rolled and the process of this invention is followed.

SUMMARY OF THE INVENTION

Figure 1:
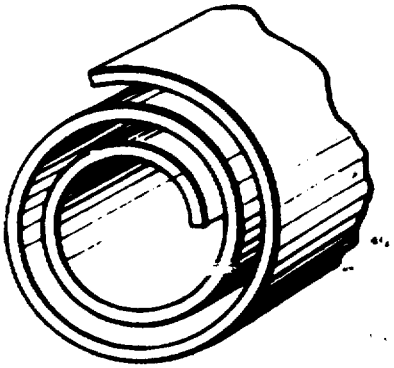
FIG. 1 shows the ceramic powder filled, plasticized polyolefin which has been rolled up prior to removal of the plasticizer and polyolefin.

This invention is a novel method of producing porous ceramic catalyst-containing structures suitable for auto exhaust systems. The method comprises shaping a filled polyolefin material containing a plasticizer, extracting the plasticizer, burning-off the polyolefin, firing the porous shaped ceramic structure, and impregnating the structure with an engine exhaust oxidizing agent. This invention facilitates production of porous ceramic structures containing suitable passages thereby increasing the effectiveness of contacting a gas or liquid with a catalyst supported on the structure. Various shaped ceramic exhaust catalyst structures can easily be prepared by the utilization of this method.

More specifically, I have found that a porous ceramic structure produced by the herein disclosed method can be impregnated with exhaust catalysts used to remove pollutants from land vehicle exhaust fumes.

DETAILED DESCRIPTION OF THE INVENTION

As shown in Christian B. Lundsager U.S. Ser. No. 83,020 supra, it has been found that a porous ceramic structure can be easily prepared from a starting material comprising a ceramic powder, a polyolefin, and a plasticizer.

Since the instant invention requires the porous structure of the Lundsager invention as a starting base for subsequent catalytic impregnation, the Lundsager structure (and its method of preparation) will here be described in detail: see especially Examples 1–22.

It is to be understood that the references made to polyolefin are generally to high molecular weight polyethylene.

More specifically a polyolefin of very high molecular weight (e.g., at least 150,000) is a good binder for ceramic powder and can tolerate high filler loadings without becoming brittle when a plasticizer is present. This is quite unlike conventional thermoplastics, e.g., polyethylene having a molecular weight of around 60,000 to 100,000 which yields brittle products at relatively low filler concentrations. Plasticizers must be incorporated into these highly filled blends to provide good flow characteristics and to facilitate mixing without causing excessive loss of flexibility. Tough, flexible compositions therefore, can be produced from a three component system consisting of (1) a high molecular weight polyolefin; (2) a filler; and (3) a plasticizer.

Each of the above stated components is essential for attainment of desirable performance of the binder system. The components of the composition can vary in the following amounts and still provide a workable plastic composition: polyolefin 5–67 percent by volume, plasticizer 15–80 percent by volume, and filler 15–80 percent by volume or polyolefin 10–70 percent by weight, plasticizer 10–70 percent by weight and filler 20–90 percent by weight. However, preferable ranges are polyolefin 5–50 percent by volume, plasticizer 20–60 percent by volume, and filler 20–50 percent by volume. The high molecular weight polymer confers strength and flexibility to the initial composition. The plasticizer, of course, also provides flexibility, but its primary role is to increase the melt index and thus produce a processable compound and to provide porosity for the combustion step and to facilitate the initial dispersion of filler into the matrix.

A wide variety of inexpensive, finely divided ceramic materials is available for use as fillers. The following types are included as examples but are not limiting in this category: (a) metal oxides and hydroxides, especially those of silicon and aluminum such as α-alumina, (b) metal silicates and aluminates; naturally occurring clays, mica, etc.; precipitated silicates, synthetic zeolites, etc., (c) titanates, zirconates, and compositions useful for making capacitors and piezoelectric devices, and (d) ferrite and garnet compositions useful in ferromagnetic devices.

More specifically, the fillers which are preferred include mullite ($3Al_2O_3 \cdot 2SiO_2$), synthetic mullite compositions, zirconmullite, spinel, and cordierite $$(2MgO \cdot 2Al_2O_3 \cdot 5SiO_2).$$

It has been found that fillers of very high surface area require more plasticizer to be processable in the plastic than fillers of less surface area and are very effective in retaining the oil, but generally give products with unmeasurably low melt indices. Additionally, ceramic powders of high surface area cannot be compounded to as high a filler loading capacity as those of a low surface area. Such fillers can be used in combination with fillers of low surface area to help retain the plasticizer.

As used herein, the terminology "plasticizer" is intended to define a material which performs five functions. First, the addition of the plasticizer will improve the processibility of the composition, i.e., lower the melt viscosity, or reduce the amount of power input which is required to compound and to fabricate the composition. As explained more fully hereinafter, the melt index is an indication of the processibility of the composition, the melt index increasing as the molecular weight and viscosity decrease. Similarly, a torque decrease indicates a lower melt viscosity and improved compounding ease (faster mixing cycle, and lower power requirements). The second function of the plasticizer is to improve the flexibility of the interim plastic composition. The improved flexibility is reflected in such measurements as the elongation at failure, the elongation at yield point, Spencer impact, and tension impact. The third function of the plasticizer is its utility in the production of the final porosity. Fourth, when the plasticizer is eventually removed the viscosity of the material is then increased. Fifth, removal of plasticizer facilitates removing gaseous combustion products which are produced when the poleolefin is burned-off. The plasticizer is the component of the polyolefin/filler/plasticizer composition that is easiest to extract. The extraction can be performed with water or with any number of commercially available organic solvents with the particular solvent depending upon the particular plasticizer used. It is especially advantageous, however, to use a plasticizer which is soluble in water. By using a water soluble plasticizer, the extraction process will be more economical due to the low cost and relative safety of water in comparison to that of organic solvents. The extraction process will also be much safer as there will be no fire or toxicity hazards encountered.

Examples of the numerous suitable plasticizers are the following:

a. chlorinated hydrocarbons b. miscellaneous plasticizers — sulfonamide, coumarone-indene, asphalt, etc.

c. hydrocarbons — paraffin oil, low polymers such as polyisobutylene and polybutadiene.

Examples of the numerous suitable water soluble plasticizers are:

a. glycol, glycol ethers and esters b. glycerin, glycerol monoacetate, etc.

c. diethylene glycol, diethylene glycol ethers and esters, triethylene glycol, etc.

d. polyethylene glycols (molecular weight range 400 to 20,000)

e. propylene glycol, dipropylene glycol f. polypropylene glycol (molecular weight range 260 to 1,200)

g. trimethylene glycol, tetramethylene glycol, 2, 3-butylene glycol, etc.

h. alkyl phosphates (e.g., triethyl phosphate)

i. water soluble polymeric materials, such as polyvinylalcohols, partially hydrolyzed pjolyvinyl acetate, polyacrylic acid, and polyvinyl pyrrolidone.

It is also possible to use various combinations of the above mentioned plasticizers, such as a water soluble and a water insoluble plasticizer with a suitable filler and high density polyethylene.

Most of the work was carried out using commercial particle form high molecular weight polyethylene, having a standard load (2,160 g.) melt index of 0.0, a high load (21,600 g.) melt index of 1.8, a density of 0.95. and a viscosity of 4.0 measured as 0.02 grams of polymer in 100 g. Decalin at 130° C. This polymer can be prepared by the method given in U.S. Pat. No. 2,825,721 using an ammonium fluoride treated chromium oxide catalyst. When the term "particle form" is used herein, it refers to the aforesaid polymer. However, any commercially available polyethylene having a standard load melt index of substantially 0 is entirely satisfactory. Many of the illustrations to be described used polyethylene having a standard load melt index of 0.00, a high load melt index of 0.01, and a viscosity of 9.3 measured as 0.02 grams of polymer in 100 g. Decalin.

It is noteworthy that melt index is a measure of polyethylene flow at standard conditions of temperature, pressure, and time through an orifice of defined diameter and length as specified in ASTMD 1238-GST condition F ("Measuring Flow Rates of Thermoplastics by Extrusion Plastometer"). The rate of extrusion in g./10 minutes is the melt index, and it is used to indicate the average molecular weight of a polymer. The lower the molecular weight of a polymer, the more rapidly it extrudes, and therefore, melt index increases as molecular weight decreases. By "high-load melt index" (HLMI) is meant melt index determined by the procedure of ASTM-D-1238-65 Condition E, except that a weight of 211,600 g. is used.

However, it has been found that in addition to high molecular weight particle-form high density (0.93–0.97) polyethylene, high molecular weight low density polyethylene, high molecular weight polypropylene, and high molecular weight particle form ethylene-butylene copolymer can also be used to give entirely satisfactory results.

Further, depending upon the desired physical properties of the final product, the high molecular weight polyethylene can be blended with standard commercial lower molecular weight polyethylene, bearing in mind the fact that if the overall molecular weight of the blended polymer becomes too low, the interim plastic product is apt to become brittle.

The technique which was employed to produce the composition can be described as follows. In most cases the various components were premixed at room temperature in a "dough-mixer." However, in some cases the filler and plasticizer were slurried together at room temperature in a volatile solvent which was evaporated before the materials were combined with the polyethylene. The polyethylene/filler/plasticizer "dry blends" (in some cases a dough, in others a powder) were then mixed in a Brabender Plastograph.

The following mixing procedure was also found to be satisfactory. The polyolefin was added to the mixing chamber which was preheated to 180° C. When the polyolefin fluxed, the filler was added, followed by the plasticizer. In those areas where the initial portions of the filler produced extremely high torque, portions of the plasticizer were added to bring the torque down before the rest of the filler was added. Generally 5 minutes was allowed to melt the polymer and add the filler. It was found that when the filler is added as a dry powder it frequently accumulates in "dead spots" on the blades or in the mixing chamber. For this reason, a method of "double compounding" is used. This is accomplished by recovering all the material from the plastograph, and then replacing it in the plastograph to get the material from the "dead spots" adequately dispersed.

It is possible to produce the composition by mixing the components in any order. Generally the components are mixed in the plastograph at 30 to 200 RPM until the mix appears to be uniform.

The final product blends can vary in overall composition according to the desired porosity in the final product. It has been determined that the greater the overall surface area of the filler, the more plasticizer that can be incorporated. Further, the relative proportions of the ingredients can vary greatly, depending both upon the desired physical properties of the intermediate product and the final product.

The polyolefin/filler/plasticizer blends were normally pressed in standard fashion common to the art on a hydraulic press into 0.020 inch (nominal thickness) sheets at 125°–175° C. for about 3 minutes at about 500 psi. The only property of interest in the intermediate plastic property is sufficient flexibility and strength to be subjected to the forming, fusing (where indicated), and extraction steps necessary before burning and firing.

The method of shaping, pressing (or fabricating), is directly related to the type of porous ceramic structure which is desired.

Figure 2:
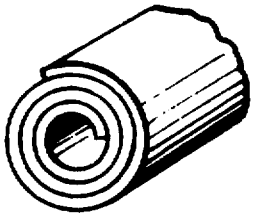
FIG. 2 shows the finished product of this invention which is obtained after the process of this invention has been completed (only the sintered ceramic material remains).

In one embodiment a smooth filled thermoplastic sheet is rolled up as in FIG. 1 and then subjected to the process of the invention. The resulting ceramic body (FIG. 2) is then high in microporosity and is readily impregnated with oxidation catalysts.

Figure 3:
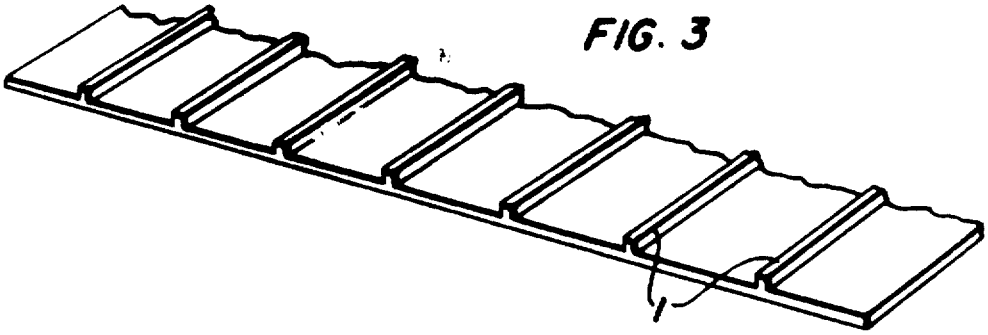
FIG. 3 shows the ceramic powder filled, plasticized polyolefin after it has been fabricated into a plastic sheet containing ribs.
Figure 4:
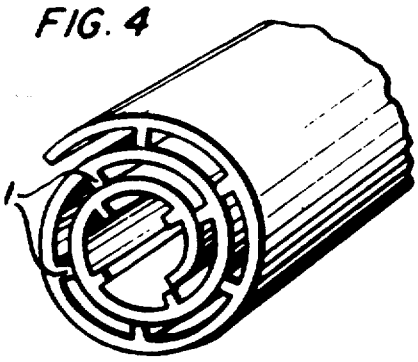
FIG. 4 shows the final product obtained when the polyolefin material shown in FIG. 3 is rolled up and the process of this invention is followed.

In another particular embodiment the filled polyolefin sheet is prepared with integral ribs as shown in FIG. 3. Following the preparation of the filled polyolefin it can be prepared as shown in FIG. 3 by any of several methods of fabricating such as molding, extrusion embossing or calendering. The sheet can then be rolled up as in FIG. 4. The ribs 1 can be toward the inside or the outside of the roll. The ribs whose shape can be continuous, discontinuous, cylindrical (like tufting in a carpet) etc. act as spacers to provide macroporosity. This type of shaping will produce a honeycombed ceramic structure exhibiting both micro and macroporosity. The microporosity is achieved as the polyolefin is eventually burned out.

Figure 5:
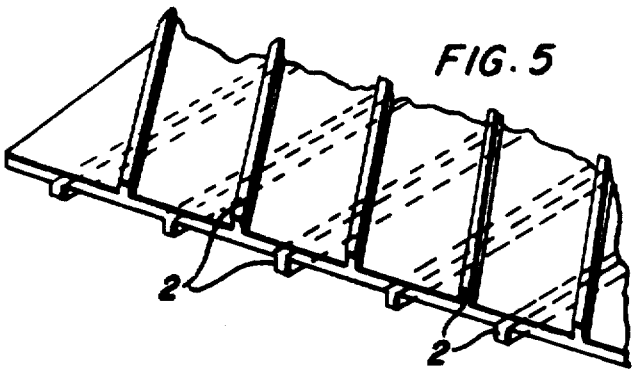
FIG. 5 shows a sheet of ceramic powder filled, plasticized polyolefin material having ribs on both sides.
Figure 6:
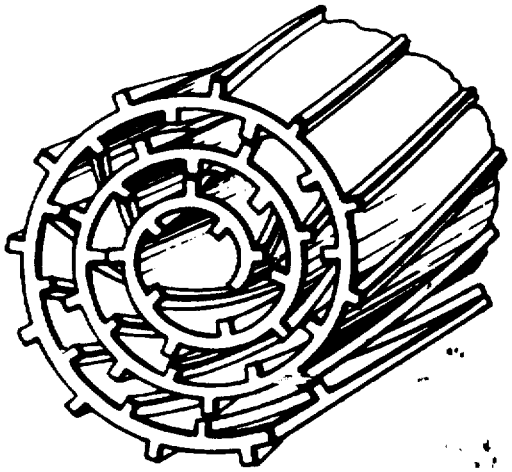
FIG. 6 shows the resulting product when

A slightly different honeycomb structure can be obtained by rolling the sheet at any angle of less than 90° (FIG. 6) when a polyolefin material having integral ribs (2, 2) on both sides (FIG. 5, wherein the ribs on each side of the sheet are not parallel in order to avoid "nesting" of the ribs on contacting sides) is used. Such a micro-macro porous ceramic body assures a turbulent flow of gas and is particularly well-suited to serve as a catalyst support having a high capacity for contacting a gas such as exhaust fumes from an automobile, in accordance with the instant invention.

Figure 7:
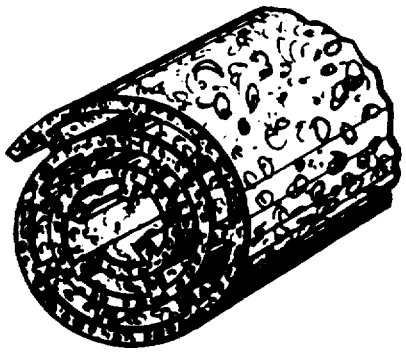
FIG. 7 shows the product obtained when a foamed polyolefin material is used.

It is possible to provide additional pore volume in a porous ceramic structure by foaming the filled polyolefin composition. (The foaming can be accomplished by the addition of any known foaming agent to the filled, plasticized polyolefin composition.) Such a composition can then be fabricated into any foamed shape by normal plastic processing means and later developed into a porous ceramic structure (FIG. 7).

Figure 8:
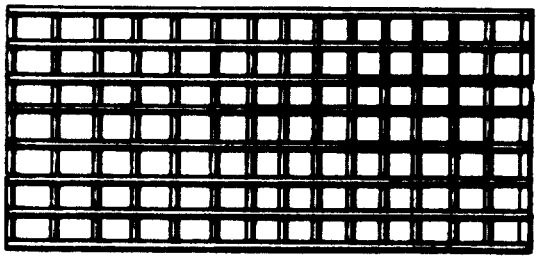
FIG. 8 shows how a ceramic powder filled, plasticized polyolefin material is arranged to produce the final product shown in FIG. 9. After the product of FIG. 9 is impregnated with the oxidizing catalyst it still has the same of the final fired product, e.g., that of FIG. 9.
Figure 9:
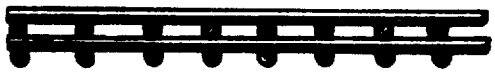

In yet another embodiment nets of filled polyolefin (FIG. 8) (as hereinafter described) can be fused together (FIG. 9) to form a three-dimensional network which, when converted into a microporous ceramic is useful as a support for a catalyst in gas contacting catalytic processes. This structure is readily impregnated with catalysts in accordance with this invention. This method produces a low density ceramic structure with a large surface and having no straight paths through the structure, thereby providing a tortuous path and a highly turbulent flow of gas. The interim fused structure can be prepared by layering net or rolling up of net, both prior to fusing the adjacent layers.

Following fusion the plasticizer is then extracted. This can be accomplished by any solvent in which the plasticizer is soluble. For example, when using a plasticizer such as mineral oil, hexane is a suitable solvent. When a water soluble plasticizer such as diethylene glycol is used, water is a suitable solvent. The removal of the plasticizer results in the formation of a microporous structure. In addition to providing greater surface area, the extraction of the plasticizer prior to burning off the polyolefin is of great value since the formation of the micropores aids in removing gaseous combination products which are formed when the polyolefin is burned off.

After the plasticizer has been extracted the structure is heated to above the degradation temperature of the thermoplastic so as to completely burn off the polyolefin. The degradation temperature will, of course, vary with the choice of polyolefin. For the high viscosity linear polyethylene that I prefer to use, a temperature in the range of at least 240° to 260° C. is greatly preferred to initiate degradation.

At a temperature of about 240° C. (when polyethylene is the polyolefin) the structure begins to turn black and at about 700° C. the structure begins to turn white, indicating that the thermoplasic has entirely burned off.

When the thermoplastic is completely burnt off, the temperature is increased to that in which the particular powder sinters into a monolithic structure, still retaining the microporosity. When using the preferred ceramic powder, α-alumina, a temperature of about 1,300°–1,450° C. is recommended. The temperature is held at the sintering point for about 2 hours and then the structure is allowed to cool slowly to room temperature. The cooling time is generally about 3–4 hours.

The resulting porous ceramic body appears identical in shape to the original plastic structure except that a slight linear shrinkage, 15–20 percent, takes place.

In addition to the basic procedure heretofore described i.e. mold, roll, heat the structure to just below the burn off point to fuse thermoplastically, extract the plasticizer, burn off the polyolefin, and fire the ceramic structure, variations of this procedure also result in excellent porous ceramics.

The method of impregnation is not critical, but rather any method which is capable of placing the catalytic components within the porous structure is sufficient. Further, the particular catalytic components used are not specific to this invention. Any of the various catalytic components suitable for removing air polluting fumes from auto gases are operable.

Some of the useful catalytic compositions are disclosed in U.S. Pat. Nos. 3,288,558; 3,295,918; 3,204,150; 3,322,-491; 3,338,666; 3,346,328; 3,455,843 and 3,470,105. These catalytic compositions include the following catalytic components in percentages by weight of the total catalyst structure.

Catalyst 1 Catalytic Components—10% CuO, 4.0% $Cr_2O_3$, 0.02% Pd.

Catalyst 2 Catalytic Components—8% CuO, 12.0% $MnO_2$, 0.02% Pd.

Catalyst 3 Catalytic Components—4% CuO, 6% $MnO_2$, 4% $Cr_2O_3$, 0.02% Pd.

Of course, other catalytic compositions are also useful.

A particularly suitable method of impregnating these catalytic components onto the porous material is that described in U.S. Pat. No. 3,455,843 wherein the copper-palladium is impregnated into the porous structure by means of a copper-palladium solution followed by impregnation with the chromia ($Cr_2O_3$) by vacuum impregnation (Catalyst 1). The components of Catalyst 2 are therein impregnated into the porous structure by immersing the structure in a copper-manganese-palladium salt solution. When this is followed by impregnation with the chromia by vacuum impregnation, a porous ceramic structure containing the catalytic components of Catalyst 3 was thereby prepared.

The following examples will aid in further explaining the invention.

EXAMPLE 1

An alumina filled polyethylene composition designated Composition A and containing the following components, 8.6 grams particle form linear polyethylene of 0 Melt Index (SLMI), 76.8 grams α-alumina, and 28.8 grams of a mineral oil with approximately 80 percent saturates (viscosity: $ss_\mu$ at 100° F.=547, refractive index=1.4932 ±0.0003, and special gravity at 15° C.=0.9036—0.9071) available commercially as Shellflex 411 was prepared by compounding the raw materials in a Brabender Plastograph at 170° C. This composition was then labeled "Plastic A" and was then pressed to a 12 mil sheet in a hydraulic press with 20 tons force, then repressed in a mold to give a ribbed sheet with a 6 mil backweb, and about 25 mil wide with a taper, 30 mil high ribs spaced one-eighth inch apart. From the ribbed sheet, strips were cut 30 mm. wide by 8 inches, and these were rolled up tightly with the ribs in the direction of the axis of the roll, forming a honeycomb-like cylinder. This was inserted into a tight fitting, glass tube, and heated to heat-seal the consecutive layers of the spiral roll of ribbed sheet at about 150° C.

The cylinder was then cooled and immersed in hexane for 30 minutes to extract substantially all the mineral oil, then dried and heated in a furnace in an oxidizing atmosphere first to about 250° C. (over a period of about 2 hours) when degradation began as evidenced by the black color of the structure. The temperature was slowly decreased and about 2 hours later and at about 700° C. the structure turned white, indicating that the burn off of the polyethylene was complete. The temperature was then slowly increased and about 2 hours later the temperature reached 1,450° where it was held for about 2 hours to sinter the remaining ceramic powder and cooled slowly (about 4 hours).

The honeycombed porous ceramic body (designated "Ceramic body A") which resulted appeared identical in shape to the original plastic structure, but the dimensions were slightly smaller. The body had good physical strength and was hard enough to scratch ordinary glass.

Weight percent can readily be converted to volume percent by dividing a given component by its density and recalculating on a percentage basis. Thus, in Example 1, the components in weight percent can be converted to volume percent as follows:

| Component | Wt. percent÷density | Volume in proportional parts | Volume percent |
|---|---|---|---|
| Polyethylene | 8.6÷1[1]= | 8.6 | 8.6÷56.6=15.2 |
| α-alumina | 76.8÷4= | 19.2 | 19.2÷56.6=33.9 |
| Mineral oil | 28.8÷1[1]= | 28.8 | 28.8÷56.6=50.9 |
| Total | | 56.6 | 100.0 |

[1] An approximation.

Volume percent is converted to weight percent by the same procedure, except that the volume percents are multiplied by the densities of the respective components.

In the generalized description, and in the claims, it will be noted that the invention is defined in volume percent. This mode of definition is frequently preferred, since the volumes of the respective components are more generally important than their respective weights as regards control of processability of the polymer/filler/plasticizer mixture and ability of the product to sinter to a strong ceramic product and yet retain useful porosity.

EXAMPLE 2

Another sample of "Composition A" was used to prepare another sample of "Plastic A" which was then pressed to a 20 mil sheet in a hydraulic press with 20 tons force, then repressed in a mold to give a ribbed sheet with 6 mil backweb and ribs on opposite sides of the sheet, crossing at 90°, each 25 mils wide (tapered) and 30 mils high, and spaced one-eighth inch apart. From the ribbed sheet strips were cut at 45° angles to both ribs 30 mils wide by 8 inches, and these strips were rolled up. Fusing was then accomplished by passing hot air through the strip as in Example 1. The fused structure was then cooled and immersed in hexane for 30 minutes to extract the plasticizer, dried and heated in a furnace first to about 250° C., then to about 700° C. and finally to 1,450° C., as in Example 1. The honeycombed porous ceramic body (designated "Ceramic Body B") which resulted appeared identical to the original plastic structure, but the dimensions were slightly smaller. This body also had good physical strength and was hard enough to scratch ordinary glass.

EXAMPLE 3

Another sample of Composition A was used to prepare another sample of "Plastic A" which was then made into a foamable material (designated "Plastic Foam A") by the addition of 0.25 percent of a chemical blowing agent, azo-bis-formamide. The foamable material was heated at 200° C. at which temperature the foaming agent decomposes. The foamed material was then water-cooled and fused as in Example 1. The plasticizer, mineral oil, was then extracted by dipping the shaped material into hexane for 30 minutes. After drying at room temperature for 30 minutes, the shaped material was heated in a furnace to about 250° C., then 700° C. and finally to 1,450° C. as in Example 1 to burn off the polyethylene and to sinter the ceramic powder and cooled slowly. The porous ceramic body (designated "Ceramic Body C") which resulted appeared identical in shape to the original foamed structure except that the dimensions were slightly smaller. This ceramic body provided additional pore volume and was less dense than Ceramic Bodies A and B.

EXAMPLE 4

Another sample of Composition A was used to prepare a sample of Plastic A which was pressed to a 20 mil sheet in a hydraulic press with 20 tons force and then pressed between two crossed, grooved press platens to produce a sample of plastic net. The net was cut, rolled up, and then fused together by heating at a temperature of about 150° C. to form a three-dimensional net structure which was then cooled to room temperature. Extraction of the plasticizer and heating to burn off the polyethylene and sinter the ceramic structure took place as in Example 1.

The porous ceramic body (designated "Ceramic Body D") was of low density (48 lbs./ft.$^3$), had a large surface, and without straight paths. The body also had good physical strength and was hard enough to scratch ordinary glass.

EXAMPLES 5 AND 6

Example 1 was repeated except that a high molecular weight ethylene-butene copolymer commercially available from Allied Chemical Company (0 standard load melt index, 1.8 high load melt index, 0.943 density, a reduced solution viscosity of 4.0 and a molecular weight of about 180,000) was used in place of polyethylene in Example 5. In Example 6, Hifax 1901, a high density linear polyethylene (0 standard load melt index, and a molecular weight of about 2 million) was used in place of the polyethylene. In each case, ceramic bodies were obtained exhibiting good strength.

Various other fillers as explained herein were used in place of a α-alumina of Example 1. Some of the particularly good ceramic powders adaptable of this invention were the following:

EXAMPLES 7–9

In Example 7 a mullite composition of 75 percent by weight raw kyanite (−325 mesh, $Al_2O_3 \cdot SiO_2$) and 25 percent by weight South Carolina kaolin (commercially available from Huber Corp.) was used in place of the α-alumina. In Example 8 a mullite composition of 75 percent by weight calcined mullite (−325 mesh, a 70 percent alumina bauxite-clay calcine) and 25 percent by weight South Carolina kaolin (Huber Corp.) was used in place of the α-alumina; and in Example 9 a mullite composition of 85 percent calcined mullite (−325 mesh, a 70 percent alumina bauxite-clay calcine) and 15 percent Jackson ball clay (commercially available from Kentucky-Tenn. Clay Corp.) was used in place of the α-alumina. In each case the sintering temperature was about 1,225–1,350° C. With each ceramic powder a ceramic body of good strength was obtained.

EXAMPLE 10

In this example a zircon-mullite composition of 50 percent calcined mullite (−325 mesh, a 70 percent alumina bauxite-clay calcined), 25 percent ground zircon (−325 mesh) and 25 percent South Carolina clay was used in place of the α-alumina of Example 1. The rest of the procedure was the same as Example 1 except that the sintering temperature was 1,225°–1,350° C. A ceramic body of good strength was obtained.

EXAMPLE 11

Example 1 was repeated except that in place of α-alumina, a spinel (commercially available from W. R. Grace & Co.) prepared from the decomposition of high purity magnesium aluminate was used. The sintering temperature was 1,225°–1,350° C. and a porous ceramic body of good strength was obtained.

Another preferred ceramic powder is that commonly referred to as cordierite, which is a zeolite of the formula $2MgO \cdot 2Al_2O_3 \cdot 5SiO_2$. The following cordierite compositions were prepared and used as the ceramic powder in the plastic composition.

EXAMPLES 12–15

In Example 12 a cordierite composition was prepared by admixing 50 percent by weight Florida kaolin and 50 percent by weight sierralite (a relatively pure prochlorite commercially available from United Sierra Div., Cyprus Mines Corp.). The mixture was substituted for the α-alumina of Example 1. The remaining procedure of Example 1 was followed. The resulting good strength, porous ceramic body was sintered at 1,200°–1,225° C. In Example 13 the procedure of Example 1 was followed except that a cordierite composition was prepared from 75 percent by weight Florida kaolin and 25 percent by weight talc. The porous ceramic body which was obtained after sintering at 1,300° C. was of good strength. In Example 14 a cordierite composition of 72.5 percent by weight Florida kaolin, 22 percent by weight talc, and 5.5 percent by weight magnesium carbonate was substituted for the α-alumina of Example 1. The rest of the procedure of Example 1 was followed except that sintering took place at 1,275°–1,300° C. and a strong porous ceramic body was obtained. In Example 15 the α-alumina of Example 1 was replaced with a cordierite composition prefaced by admixing 68 percent by weight Florida kaolin, 15 percent by weight talc, and 17 percent by weight magnesium carbonate. The rest of the procedure of Example 1 was followed and a strong porous ceramic body was obtained.

EXAMPLES 16–19

Example 1 was repeated except that the plasticizer, mineral oil, was replaced by the following plasticizers: glycerin (Example 16), diethylene glycol (Example 17), dipropylene glycol (Example 18), and polyacrylic acid (Example 19). In each case the plasticizer was extracted with water and the end product was a strong porous ceramic material.

EXAMPLE 20

This example is intended to show the importance of the plasticizer in the filled polyolefin. A filled plastic material was prepared from 66.7 percent by volume (90 percent by weight) α-alumina and 33.3 percent by volume (10 percent by weight) particle form linear polyethylene of 0 melt index. The procedure of Example 1 (except, of course, for the plasticizer extraction step) was repeated. The resulting ceramic structure was distorted, one end was bubbly, and there was a hole through the center of the structure.

EXAMPLE 21

This example illustrates the necessity of using a high molecular weight polyolefin.

The same composition as used in Example 1, except that in place of the high molecular weight polyethylene a normal molecular weight polyethylene having a standard load melt index of 2.0 was utilized to attempt to prepare a porous ceramic structure. When the structure was burned to remove the polyethylene, the polyethylene melted and prevented the formation of any ceramic body.

EXAMPLE 22

The same composition as that used in Example 1 was used, except that it was made into a sheet without ribs. When fusion took place the entire material fused giving a cylindrical structure containing micropores, but not any macropores. The porous ceramic structure was very strong and hard enough to scratch glass.

EXAMPLE 23

Three "Ceramic Bodies A," three "Ceramic Bodies B," three "Ceramic Bodies C," three "Ceramic Bodies D" were each impregnated with the following catalytic components: 4.64% $Cr_2O_3$, 6.96% $MnO_2$, 4.64% CuO, and 0.02% Pd (percentages are by weight). The method of impregnation was that described heretofor.

A "screen system" was used to determine the effectiveness of the catalytic compositions on the porous base material prepared by the process of this invention. A feed composition consisting of the following components was passed through the product of this invention: N-hexane and 750 p.p.m. carbon, 1,000 p.p.m. NO, 1.0% CO, 2.0% $O_2$ and 10.0% $H_2O$.

The inlet temperature (the point at which the feed composition entered the product of this invention) was about 300° F. The temperature was increased 50° at about 15 minute intervals over a total period of 3 hours. The results are given in the following Table 1:

TABLE 1

| Temperature | Percent CO conv.* | Percent HC conv.* |
|---|---|---|
| 300 | 7.6 | 4.0 |
| 350 | 14.8 | 5.6 |
| 400 | 24.8 | 6.8 |
| 450 | 34.6 | 7.8 |
| 500 | 44.4 | 9.0 |
| 550 | 53.6 | 17.0 |
| 600 | 63.0 | 26.0 |
| 650 | 72.8 | 35.0 |
| 700 | 82.0 | 43.8 |
| 750 | 82.6 | 48.6 |
| 800 | 83.8 | 53.2 |
| 850 | 85.0 | 57.8 |
| 900 | 86.6 | 62.0 |

*Percent of CO and HC removed from the feed composition steam.

For purposes of determining the effectiveness of the product of this invention it was decided to measure the amount of catalytic activity, hereafter referred to as "activity." Activity graphs were prepared wherein the horizontal axis represented temperatures ranging from 350° to 850° F. and the vertical axis represented the amount of conversion of the base component of the feed composition. With reference to the whole area of the rectangle formed with base "350–850° F." and altitude "0–100% conversion," the ratio of the area on the graph beneath the plotted line to the whole area, times 100, was referred to as the "percentage of activity." An ideal catalyst would, of course, have a "percentage of activity" of 100. For the particular catalytic component used in this example the "percentage of activity" was obtained as follows:

| | |
|---|---|
| CO | 59.1 |
| HC | 27.8 |

It was also found that the temperature for a 10 percent conversion of CO was 316° F. and for HC the temperature was 506° F. The temperature necessary for 50 percent conversion was 530° F. for CO and 765° F. for HC.

These results are comparable to those obtained when other forms of catalyst are used for auto exhaust control.

It is claimed:

1. A process for preparing an engine exhaust catalyst comprising the following steps:

a. homogeneously blending a composition consisting essentially of 15–80 volume percent of a polyolefin having a molecular weight of at least 150,000 and a standard load melt index of substantially zero, 5–67 volume percent of a ceramic filler, selected from the group consisting of alumina, mullite, zircon mullite, magnesium aluminate spinel and cordierite, and 15–80 volume percent of a plasticizer: selected from the group consisting of mineral oils diethylene glycol, propylene glycol, dipropylene glycol glycerine, and a glycerol monoacetate, trimethylene glycol, tetramethylene glycol, 2,3-butylene glycol, triethyl phosphate, polyvinyl alcohol, and polyvinyl pyrrolidone, b. heating said composition to about 125° to 175° C., molding to form a plastic sheet and impressing ribs thereon, c. rolling said plastic sheet so that said ribs contact said sheet, heating to about 150° C. to just below the burn off point to fuse the contacting areas together thermoplastically, d. extracting said plasticizer with water or an organic solvent, e. removing said polyolefin by heating to 240° to 700° C. to form a porous ceramic structure, and to burn off the polyolefin and, f. firing said porous ceramic structure at a temperature of 1,300° to 1,450° C. [for about 2 hours] *for a time sufficient* to sinter said porous ceramic structure, g. impregnating the porous ceramic structure with solutions of soluble salts of metals exhibiting catalytic activity for converting engine exhaust gases and heating to convert the metals to the active form.

2. The process according to claim 1 wherein said polyolefin is selected from the group consisting of polyethylene, copolymers of polyethylene, and polypropylene, the plasticizer is mineral oil and the plasticizer is removed by contacting the fused structure with hexane.

3. The process according to claim 1 wherein the soluble metal salts include salts selected from the group consisting of copper, chromium, manganese, and palladium salts and mixtures thereof.

4. The process according to claim 3 wherein the solutions contain a sufficient quantity of metal salts to prepare a catalyst containing about 4 to 10 percent CuO, about 4 percent $Cr_2O_3$, 0 to 12 percent $MnO_2$ and 0.02 percent Pd.

References Cited

The following references, cited by the Examiner, are of record in the patented file of this patent or the original patent.

UNITED STATES PATENTS

| | | | |
|---|---|---|---|
| 3,125,618 | 3/1964 | Levinson | 264—63 |
| 3,285,873 | 11/1966 | Bailey | 264—63 X |
| 3,362,783 | 11/1968 | Leak | 252—477 R |
| 3,377,269 | 4/1968 | Bloch | 252—477 R |
| 3,437,605 | 4/1969 | Keith | 252—477 R |
| 3,467,602 | 9/1969 | Koester | 252—477 R |
| 3,533,753 | 10/1970 | Berger | 264—59 X |

CARL F. DEES, Primary Examiner

U.S. Cl. X.R.

252—465, 466 PT, 477 R